Patented Apr. 18, 1933

1,904,640

UNITED STATES PATENT OFFICE

ROBERT ERWIN WINDECKER, OF PAINESVILLE, OHIO

MANUFACTURE OF CEMENT

No Drawing.   Application filed June 10, 1931.   Serial No. 543,383.

This invention relates to improvements in the manufacture of hydraulic cements. The invention relates particularly to improvements in the manufacture of such cements providing for the economical production of high quality hydraulic cements developing high early strength. Ordinary hydraulic cements develop strengths approximating the maximum for the material only after a prolonged period of days. The advantages of hydraulic cements which would develop high strengths in a shorter period of time are so apparent as not to need enumeration. In general these advantages relate to economies with respect to time which appear in several aspects. Various manufacturing schemes have been proposed to provide hydraulic cements developing high early strength. Some of them have been satisfactory except with respect to cost. Others less costly have not been so satisfactory. This invention relates to a particular method of producing high quality hydraulic cements developing high early strength.

I have discovered that high quality hydraulic cements developing high early strength can be produced economically by clinkering cement mixtures having a lime modulus exceeding 2.20 and including a fluoride flux, calcium fluoride for example, and incorporating a minor proportion of a water soluble salt of the class comprising sodium sulphate, calcium chloride, magnesium chloride, sodium carbonate and magnesium sulphate in the cement produced by grinding the resulting clinker. The lime modulus of the cement mixture may with advantage fall within the range 2.30–2.50. Of the several water soluble salts mentioned sodium sulphate appears to be the most advantageous and calcium chloride and magnesium chloride the next most advantageous. Although best results are usually secured within rather narrow limits, improved results are secured over a substantial variation in proportion of the water soluble salt used. Proportions of the water soluble salt ranging from 0.3% to 5.0% by weight on the clinker, for example, are useful. With sodium sulphate, best results are usually secured in the range 0.5–1.3%. With calcium chloride and magnesium chloride, best results are usually secured in the range 0.5–1.5%. The proportion of fluoride flux included in the cement mixture subjected to clinkering may be varied, for example, from 0.5 to 5.0% by weight on the clinker; a proportion in the range of 1.0–3.0% is usually advantageous. I have also discovered that the development of high early strength is promoted if the iron content, computed as iron oxide ($Fe_2O_3$), is limited not to exceed 3.0% in the cement mixture subjected to clinkering. Higher iron contents seem to react unfavorably upon early strength to a much greater extent than they do upon ultimate strength. If the iron content of the cement mixture subjected to clinkering is limited not to exceed about 0.4% of iron, computed as iron oxide, white hydraulic cement offering similar advantages can be produced.

The various constituents of the cement mixture subjected to the clinkering operation may be ground separately or together, wet or dry, and the ground mixture may be supplied to the clinkering operation as a powder, or in an agglomerated form or as a slurry. The raw cement mixture may include calcium carbonte or other material supplying a substantial proportion of calcium oxide, kaolin or clay or other silicius material or mixtures of such materials, or of such materials and silica. The raw cement mixture prior to clinkering may be ground, for example, to a fineness such that 92%±4% will pass through a standard two hundred mesh sieve. The clinkering operation may be carried out in a conventional rotary kiln, or in any other appropriate type of furnace or kiln. Clinkering temperatures in the range of 2700–2950° F. are usually advantageous. The clinker may be ground, for example, to a fineness such that 96%±3% will pass through a standard two hundred mesh sieve. The usual retarder, gypsum, may be incorporated in the cement produced by grinding the clinker in the usual proportions.

The water soluble salt may be incorporated in the cement produced by grinding the clinker, before grinding or during grinding or during blending or at any time subsequent to clinkering.

The manufacture of high quality hydraulic cements developing high early strengths in accordance with my invention will be illustrated by the following examples:

*Example I*

A raw cement mixture containing limestone and clay, cement rock or other appropriate materials is so proportioned that when ground and mixed with 1.3–2.0% of calcium fluoride—raw basis—or 2.0–3.0% of calcium fluoride—clinker basis—and clinkered at a temperature approximating, for example, 2700–2900° F., and the clinker, thus produced, ground with the usual retarder and 0.5–2.0% of sodium sulphate—clinker basis— a hydraulic cement containing 19.62% silica, 1.90% iron oxide, 5.72% alumina, and 65.54% calcium oxide will be produced.

*Example II*

A raw cement mixture containing limestone and clay, cement rock or other appropriate materials is so proportioned that when ground and mixed with 1.0–1.7% calcium fluoride—raw basis—or 1.5–2.5% of calcium fluoride—clinker basis—and clinkered at a temperature approximating, for example, 2700–2900° F., and the clinker, thus produced, ground with the usual retarder and 0.5–2.0% of sodium sulphate—clinker basis— a hydraulic cement containing 19.9% silica, 2.4% iron oxide, 5.9% alumina, 65.0% calcium oxide will be produced.

*Example III*

A raw cement mixture containing limestone and clay, cement rock or other appropriate materials is so proportioned that when ground and mixed with 1.5–2.2% calcium fluoride—raw basis—or 2.3–3.3% calcium fluoride—clinker basis—and clinkered at a temperature approximating, for example, 2750–2950° F., and the clinker, thus produced, ground with the usual retarder and 0.5–2.0% sodium sulphate—clinker basis—a hydraulic cement containing 19.0% silica, 2.1% iron oxide, 5.3% alumina, 66.0% calcium oxide will be produced.

*Example IV*

A raw cement mixture containing limestone and clay, or other appropriate materials, the iron content of which when subjected to the clinkering operation being limited not to exceed about 0.4% iron, computed as iron oxide, is so proportioned that when ground and mixed with 1.3–2.0% calcium fluoride—raw basis—or 2.0–3.0% calcium fluoride—clinker basis—and clinkered at a temperature approximating, for example, 2700–2900° F., and the clinker, thus produced, ground with the usual retarder and 0.5–2.0% sodium sulphate—clinker basis—a white hydraulic cement containing 21.0% of silica, 8.0% alumina, 68.0% calcium oxide will be produced.

*Example V*

A raw cement mixture containing limestone and clay, or other appropriate materials, the iron content of which when subjected to the clinkering operation being limited not to exceed about 0.4% iron, computed as iron oxide, is so proportioned that when ground and mixed with 1.3–2.0% calcium fluoride—raw basis—or 2.0–3.0% calcium fluoride—clinker basis—and clinkered at a temperature approximating, for example, 2750–2950° F., and the clinker, thus produced, ground with the usual retarder and 1.0–2.0% calcium or magnesium chloride— clinker basis—a white hydraulic cement containing 21.0% silica, 7.0% alumina, and 66.0% calcium oxide will be produced.

The lime modulus of all of the foregoing cement mixtures exceeds 2.20. In referring to the lime modulus, I refer to the ratio of the percentage of lime to the sum of the percentages of silica, alumina and iron oxide.

The inclusion of the fluoride flux in the raw cement mixture subjected to clinkering improves the economy of the operation in reducing the clinkering temperature and also seems to bring the clinkering temperature within a range particularly advantageous in producing, in conjunction with subsequent incorporation of the water soluble salts mentioned, high quality hydraulic cements developing high early strengths.

In a cement produced generally as described in the first example, having a lime modulus of 2.40, the incorporation of 0.66% of sodium sulphate produced a cement developing a tensile strength of 350 pounds per square inch in twenty-four hours, 452 pounds per square inch in seventy-two hours and 465 pounds per square inch in twenty-eight days, and the incorporation of 1.0% of sodium sulphate produced a cement developing a tensile strength of 365 pounds per square inch in twenty-four hours, 432 pounds per square inch in seventy-two hours and 460 pounds per square inch in twenty-eight days, and the incorporation of 1.0% of calcium chloride produced a cement developing a tensile strength of 320 pounds per square inch in twenty-four hours, 430 pounds per square inch in seventy-two hours and 455 pounds per square inch in twenty-eight days. In each instance the testing briquets were made according to the present standards of the American Society for Testing Materials, and consisted of one part of cement to three parts of standard Ottawa sand.

Extreme purity of the water soluble salts used is not essential. For example, I have successfully used commercial salt cake as sodium sulphate in carrying out my invention.

This application is in part a continuation of my application filed September 25, 1930, Serial Number 484,469, and of my application filed February 7, 1931, Serial Number 514,305, and of my application filed May 17, 1930, Serial No. 453,408.

I claim:

1. In the manufacture of high early strength hydraulic cement, the improvement comprising clinkering a cement mixture including a fluoride flux the lime modulus of which exceeds 2.20 and incorporating a water soluble salt selected from the group consisting of sodium sulphate, sodium carbonate and magnesium sulphate in the cement produced by grinding the clinker.

2. In the manufacture of high early strength hydraulic cement, the improvement comprising clinkering a cement mixture including a fluoride flux the lime modulus of which exceeds 2.20 and the iron content of which does not exceed 3.0% computed as iron oxide and incorporating a water soluble salt selected from the group consisting of sodium sulphate, sodium carbonate and magnesium sulphate in the cement produced by grinding the clinker.

3. In the manufacture of high early strength white hydraulic cement, the improvement comprising clinkering, a cement mixture including a fluoride flux the lime modulus of which exceeds 2.20 and the iron content of which does not exceed 0.4% computed as iron oxide and incorporating a water soluble salt selected from the group consisting of sodium sulphate, sodium carbonate and magnesium sulphate in the cement produced by grinding the clinker.

4. In the manufacture of high early strength hydraulic cement, the improvement comprising clinkering a cement mixture including a fluoride flux the lime modulus of which approximates 2.30–2.50 and incorporating a water soluble salt selected from the group consisting of sodium sulphate, sodium carbonate and magnesium sulphate in the cement produced by grinding the clinker.

5. In the manufacture of high early strength hydraulic cement, the improvement comprising clinkering a cement mixture including a fluoride flux the lime modulus of which exceeds 2.20 and incorporating sodium sulphate in the cement produced by grinding the clinker.

6. In the manufacture of high early strength hydraulic cement, the improvement comprising clinkering a cement mixture including a fluoride flux the lime modulus of which exceeds 2.20 and the iron content of which does not exceed 3.0% computed as iron oxide and incorporating sodium sulphate in the cement produced by grinding the clinker.

7. In the manufacture of high early strength white hydraulic cement, the improvement comprising clinkering a cement mixture including a fluoride flux the lime modulus of which exceeds 2.20 and the iron content of which does not exceed 0.4% computed as iron oxide and incorporating sodium sulphate in the cement produced by grinding the clinker.

8. In the manufacture of high early strength hydraulic cement, the improvement comprising clinkering a cement mixture including a fluoride flux the lime modulus of which approximates 2.30–2.50 and incorporating sodium sulphate in the cement produced by grinding the clinker.

In testimony whereof I affix my signature.

ROBERT ERWIN WINDECKER.

CERTIFICATE OF CORRECTION.

Patent No. 1,904,640. April 18, 1933.

ROBERT ERWIN WINDECKER.

It is hereby certified that error appears in the printed specification of the above numbered patent requiring correction as follows: Page 1, line 80, for "carbonte" read "carbonate"; line 82, for "silicius" read "silicious"; and line 86, for "finess" read "fineness"; page 2, line 69, for "68.0%" read "66.0%"; and that the said Letters Patent should be read with these corrections therein that the same may conform to the record of the case in the Patent Office.

Signed and sealed this 23rd day of May, A. D. 1933.

(Seal)

M. J. Moore.
Acting Commissioner of Patents.